(12) United States Patent
Kawaguchi et al.

(10) Patent No.: US 12,297,861 B2
(45) Date of Patent: May 13, 2025

(54) INSULATED BEARING DEVICE

(71) Applicant: NTN Corporation, Osaka (JP)

(72) Inventors: Hayato Kawaguchi, Shizuoka (JP); Toshiki Masuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 144 days.

(21) Appl. No.: 18/033,892

(22) PCT Filed: Oct. 26, 2021

(86) PCT No.: PCT/JP2021/039445
§ 371 (c)(1),
(2) Date: Nov. 3, 2023

(87) PCT Pub. No.: WO2022/092070
PCT Pub. Date: May 5, 2022

(65) Prior Publication Data
US 2024/0068511 A1    Feb. 29, 2024

(30) Foreign Application Priority Data

Oct. 29, 2020  (JP) ................................ 2020-181355

(51) Int. Cl.
| F16C 19/06 | (2006.01) |
| F16C 19/52 | (2006.01) |
| F16C 35/077 | (2006.01) |

(52) U.S. Cl.
CPC .............. *F16C 19/06* (2013.01); *F16C 19/52* (2013.01); *F16C 35/077* (2013.01); *F16C 2380/26* (2013.01)

(58) Field of Classification Search
CPC ........ F16C 19/06; F16C 19/52; F16C 35/077; F16C 2380/26
See application file for complete search history.

(56) References Cited

U.S. PATENT DOCUMENTS 9,581,203 B2 *  2/2017  White ................ F16C 33/7823
2009/0304318 A1 *  12/2009  Konno .................... F16C 33/62
384/492

(Continued)

FOREIGN PATENT DOCUMENTS

DE   102013225341 A1 *  6/2015  ............ F16C 35/073
JP       04210124 A  *  7/1992

(Continued)

OTHER PUBLICATIONS

International Search Report issued Jan. 11, 2022 in corresponding International (PCT) Application No. PCT/JP2021/039445, with English translation.

*Primary Examiner* — Phillip A Johnson
(74) *Attorney, Agent, or Firm* — Wenderoth, Lind & Ponack, L.L.P.

(57) ABSTRACT

An insulated bearing device includes a housing, an outer ring and rolling elements, and an insulating film for providing electrical insulation between the housing and the outer ring is disposed on the surface of the outer ring. The insulating film includes a straight portion extending along the outer periphery of the outer ring and having a constant outer diameter in the axial direction. The housing has, on the inner periphery of its housing hole, an inner peripheral cylindrical surface formed at a position intersecting with the axial centerlines of the rolling elements, and the straight portion is fitted to, and in contact with, the inner peripheral cylindrical surface. The contact range (area of contact) between the inner peripheral cylindrical surface and the straight portion has an axial length shorter than the entire axial length of the straight portion.

8 Claims, 6 Drawing Sheets

(56) References Cited

U.S. PATENT DOCUMENTS

2016/0348717 A1* 12/2016 Churchley ............ F16C 35/077
2019/0120288 A1* 4/2019 Yamada .................. F16C 33/64

FOREIGN PATENT DOCUMENTS

| | | |
|---|---|---|
| JP | 6-147231 | 5/1994 |
| JP | 2007-100914 | 4/2007 |
| JP | 2007-298060 | 11/2007 |
| JP | 2008-169959 | 7/2008 |
| JP | 2009-133483 | 6/2009 |
| JP | 2014-81004 | 5/2014 |

* cited by examiner

INSULATED BEARING DEVICE

TECHNICAL FIELD

The present invention relates to an insulated bearing device in which electric corrosion is prevented.

BACKGROUND ART

In electric vehicles such as battery-powered electric vehicles (EV) and hybrid electric vehicles (HEV), an electric motor is used as an engine for driving a vehicle. On the other hand, in electric vehicles, in order to supply AC power to the electric motor, an inverter is used to convert the DC power of the battery into AC power, and, in order to increase the efficiency of the electric motor, the frequency of the AC power supplied to the electric motor is set high.

When high-frequency AC power is supplied to the electric motor, an electric current tends to flow in a rolling bearing supporting the rotary shaft of the electric motor. If an electric current flows in the rolling bearing, sparks are generated between the raceway surfaces and the rolling elements of the rolling bearing, and the sparks may cause damage to the raceway surfaces to progress gradually (this phenomenon is called "electric corrosion").

In order to prevent such electric corrosion, an insulated bearing such as disclosed in, e.g., Japanese Unexamined Patent Application Publication No. 2007-298060 (hereinafter, JP '060) is generally used. Such an insulated bearing includes an outer ring fitted in a housing hole of a housing; an inner ring arranged radially inwardly of, and coaxially with, the outer ring; and a plurality of rolling elements disposed between the outer ring and the inner ring, and an insulating film that provides electrical insulation between the housing and the outer ring is disposed on the surface of the outer ring.

Even if an insulating film is disposed for providing electrical insulation between the housing and the outer ring, when an AC voltage acts between the housing and the outer ring, the housing and the outer ring, which are separated from each other by the insulating film, repeatedly store and discharge electricity as a capacitor, thereby allowing an alternating electric current to flow in the rolling bearing. The magnitude of this alternating electric current increases as the impedance between the housing and the outer ring decreases (i.e., as the capacitance between the housing and the outer ring increases). That is, the magnitude of the alternating electric current increases as the areas of the opposed portions of the metal surfaces of the housing and the outer ring opposed to each other via the insulating film increase, and also increases as the distance between the metal surfaces of the housing and the outer ring opposed to each other via the insulating film decreases.

In order to reduce the magnitude of this alternating electric current, the above-mentioned JP '060 reference proposes an insulated bearing in which, as illustrated in FIG. 1(a) of that document, a recess is disposed in the axial central portion of the outer peripheral surface of the outer ring, and an insulating film having a constant thickness is disposed on a surface of the outer ring including the recess. The insulating film includes an outer peripheral surface portion extending along the outer periphery of the outer ring; a pair of end surface portions extending along the respective end surfaces of the outer ring on both axial sides thereof, and a pair of chamfers having a circular arc-shaped cross section, and connecting together the outer peripheral surface portion and the respective end surface portions. The outer peripheral surface portion of the insulating film has a recessed portion recessed corresponding to the shape of the recess of the outer periphery of the outer ring.

By using the insulated bearing of FIG. 1(a) of JP '060, since, at the recess in the axial central portion of the outer peripheral surface of the outer ring, the distance between the metal surfaces of the outer ring and a housing opposed to each other via the insulating film increases, the impedance between the housing and the outer ring increases corresponding to the depth of the recess. This reduces the magnitude of the alternating electric current that flows in the rolling bearing when an AC voltage acts between the housing and the outer ring.

However, if, as illustrated in FIG. 1(a) of JP '060, a recess is disposed in the axial central portion of the outer peripheral surface of the outer ring, and an insulating film is disposed on the surface of the outer ring including the recess, the formability of such an insulating film is not good. Therefore, such an insulated bearing has a problem of low productivity.

That is, if a recess is disposed in the axial central portion of the outer peripheral surface of the outer ring, and an insulating film is disposed on a surface of the outer ring including the recess, it is difficult to form a uniform and stable film on the inside and outside of the recess, and thus productivity is low.

It is an object of the present invention to provide an insulated bearing device in which the impedance between the outer ring and a housing is high, and of which the insulating film can be formed easily.

SUMMARY OF THE INVENTION

In order to achieve the above object, the present invention provides an insulated bearing device comprising: a housing formed with a housing hole; an outer ring fitted in the housing hole; an inner ring arranged radially inwardly of, and coaxially with, the outer ring; and a plurality of rolling elements mounted between the outer ring and the inner ring. An insulating film that provides electrical insulation between the housing and the outer ring is disposed on a surface of the outer ring. The insulating film comprises: a straight portion extending along an outer periphery of the outer ring and having a constant outer diameter in an axial direction; a pair of end surface portions extending along respective end surfaces of the outer ring on both axial sides of the outer ring; and a pair of chamfers having a circular arc-shaped cross section, and connecting together the straight portion and the respective end surface portions. The housing has, on an inner periphery of the housing hole, an inner peripheral cylindrical surface formed at a position intersecting with axial centerlines of the rolling elements, and the straight portion is fitted to, and in contact with, the inner peripheral cylindrical surface. A contact range (area of contact) between the inner peripheral cylindrical surface and the straight portion has an axial length shorter than an entire axial length of the straight portion.

With this arrangement, the straight portion of the insulating film, which extends along the outer periphery of the outer ring, is in contact, not along the entire axial length of the straight portion, but within a range shorter than the entire axial length of the straight portion, with the inner peripheral cylindrical surface of the housing hole. Therefore, the impedance between the housing and the outer ring is higher corresponding to the reduced axial length of the contact range. This effectively reduces the magnitude of the alternating electric current that flows when an AC voltage acts between the housing and the outer ring. Also, since the portion of the insulating film extending along the outer periphery of the outer ring is a straight portion having a constant outer diameter in the axial direction, and no recess is present in the insulating film, formation of the insulating film is easy, and productivity is excellent.

As an arrangement in which the axial length of the contact range (area of contact) between the inner peripheral cylindrical surface and the straight portion is shorter than the entire axial length of the straight portion, for example, the arrangement described below may be used.

The inner peripheral cylindrical surface has first and second axial ends, the first axial end of the inner peripheral cylindrical surface is axially displaced from one (a first) axial end of the straight portion, away from the axial centerlines of the rolling elements. The second axial end of the inner peripheral cylindrical surface is axially displaced from the other (a second) axial end of the straight portion toward the axial centerlines of the rolling elements. The housing has: an axially inner end surface extending radially inwardly from the first axial end of the inner peripheral cylindrical surface, and kept in contact with one of the end surface portions; and a non-contact surface extending radially outwardly from the second axial end of the inner peripheral cylindrical surface.

With this arrangement, it is possible to increase the impedance between the housing and the outer ring, while axially positioning the outer ring with the axially inner end surface of the housing.

Also, as an arrangement in which the axial length of the contact range (area of contact) between the inner peripheral cylindrical surface and the straight portion is shorter than the entire axial length of the straight portion, for example, the arrangement described below may be used.

The inner peripheral cylindrical surface has first and second axial ends. The first axial end of the inner peripheral cylindrical surface is axially displaced from one (a first) axial end of the straight portion toward the axial centerlines of the rolling elements, and the second axial end of the inner peripheral cylindrical surface is axially displaced from the other (a second) axial end of the straight portion toward the axial centerlines of the rolling elements. The housing includes: a first non-contact surface extending radially outwardly from the first axial end of the inner peripheral cylindrical surface; and a second non-contact surface extending radially outwardly from the second axial end of the inner peripheral cylindrical surface.

With this arrangement, it is possible to particularly effectively decrease the areas of the portions of the housing and the outer ring opposed to each other via the insulating film, and to effectively increase the impedance between the housing and the outer ring.

In this arrangement, the housing may further include: a first auxiliary support portion supporting an outer periphery of the straight portion at a position axially spaced apart from the first non-contact surface; and a second auxiliary support portion supporting the outer periphery of the straight portion at a position axially spaced apart from the second non-contact surface.

With this arrangement, even when a misalignment is present between the center axes of the housing hole and the rotary shaft, the outer ring is stably supported.

The inner peripheral cylindrical surface is preferably formed such that major-axis ranges of contact ellipses defined by contact between the rolling elements and the outer ring are located within a contact range between the inner peripheral cylindrical surface and the straight portion.

With this arrangement, even when a large load is applied between the rotary shaft and the housing, the outer ring is stably supported in the housing hole.

For the insulated bearing device of the present invention, the straight portion of the insulating film, which extends along the outer periphery of the outer ring, is in contact, not along the entire axial length of the straight portion but within a range shorter than the entire axial length of the straight portion, with the inner peripheral cylindrical surface of the housing hole. Therefore, the impedance between the housing and the outer ring is higher by the reduced axial length of the contact range. This effectively reduces the magnitude of the alternating electric current that flows when an AC voltage acts between the housing and the outer ring. Also, since the portion of the insulating film extending along the outer periphery of the outer ring is a straight portion having a constant outer diameter in the axial direction, and no recess is present in the insulating film, formation of the insulating film is easy, and the productivity is excellent.

DETAILED DESCRIPTION OF THE INVENTION

Figure 1:
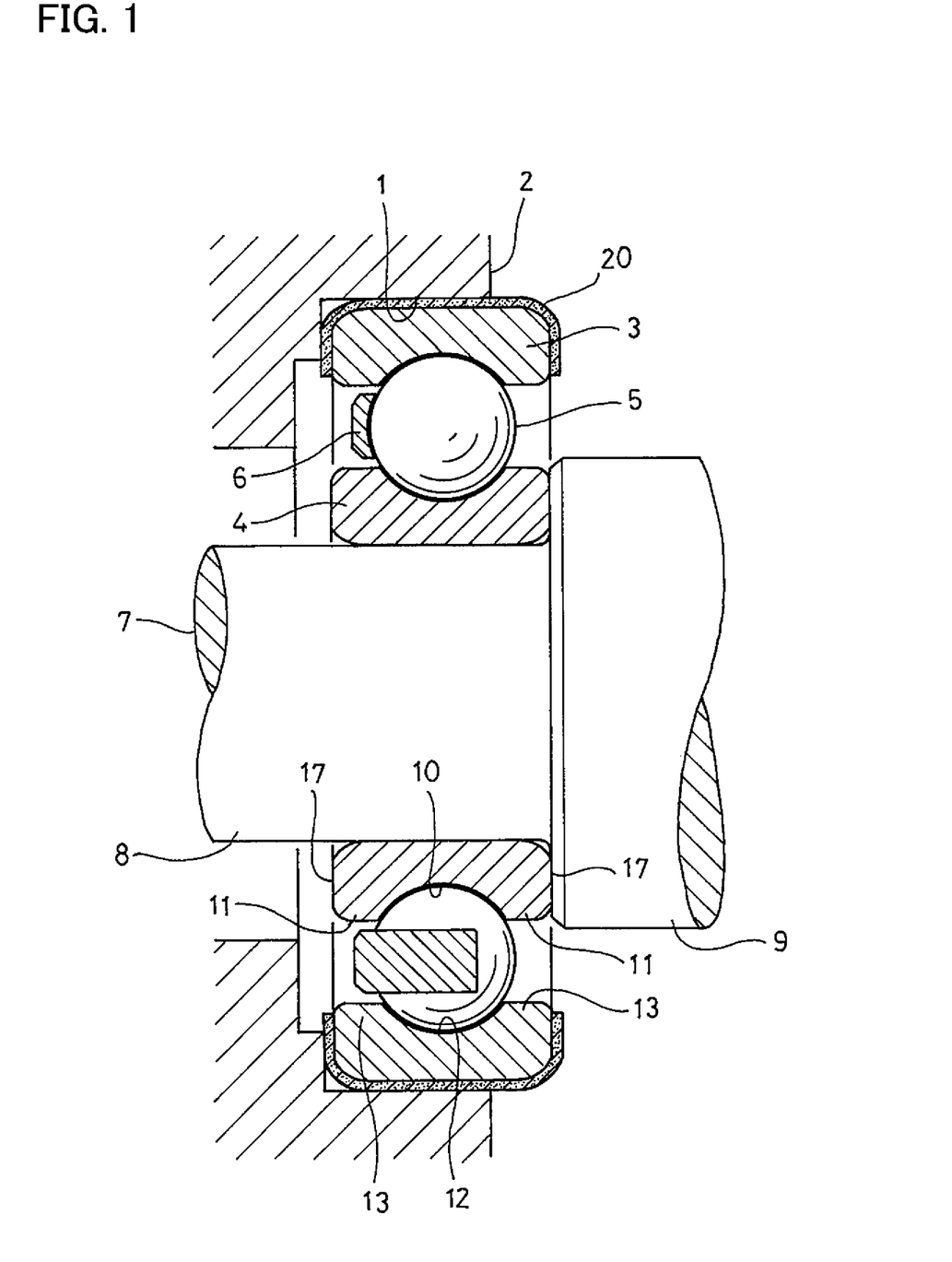
FIG. 1 is a sectional view of an insulated bearing device according to a first embodiment of the present invention.

FIG. 1 illustrates an insulated bearing device according to the first embodiment of the present invention. This insulated bearing device includes a housing 2 having a housing hole 1; an outer ring 3 fitted in the housing hole 1; an inner ring 4 arranged radially inwardly of, and coaxially with, the outer ring 3: a plurality of rolling elements 5 disposed between the outer ring 3 and the inner ring 4; a cage 6 that keeps the circumferential distances between the rolling elements 5; and a rotary shaft 7 fitted to the inner ring 4. The outer ring 3, the inner ring 4 and the rolling element 5 are all made of metal. The rolling elements 5 are balls in the shown example.

The rotary shaft 7 is the rotary shaft of an electric motor for driving an electric vehicle. The rotary shaft 7 includes a small-diameter shaft portion 8 fitted to the inner periphery of the inner ring 4; and a large-diameter shaft portion 9 kept in contact with an axial end surface of the inner ring 4. The large-diameter shaft portion 9 has an outer diameter larger than the outer diameter of the small-diameter shaft portion 8. The rotary shaft 7 is made of metal. The housing 2 is also made of metal.

The inner ring 4 has, on its outer periphery, an inner ring raceway groove 10 with which the rolling elements 5 come into rolling contact; and inner ring shoulders 11 located on both axial sides of the inner ring raceway groove 10. The outer ring 3 also has, on its inner periphery, an outer ring raceway groove 12 with which the rolling elements 5 come into rolling contact; and outer ring shoulders 13 located on both axial sides of the outer ring raceway groove 12. The inner ring raceway groove 10 and the outer ring raceway groove 12 are grooves both having a circular arc-shaped cross section.

Figure 2:
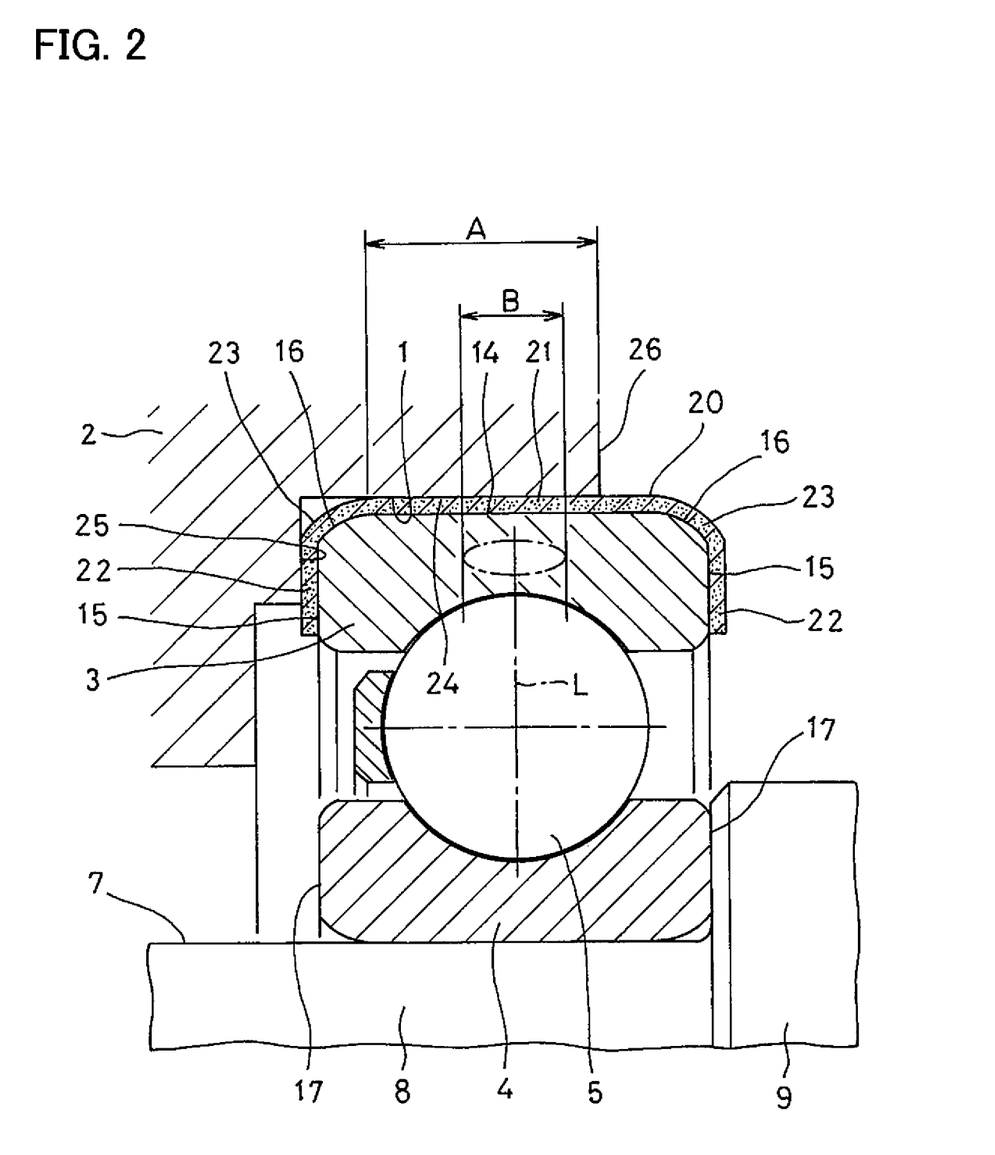
FIG. 2 is an enlarged sectional view of the insulated bearing device of FIG. 1.

As illustrated in FIG. 2, the outer ring 3 has, on its outer periphery, a cylindrical surface 14 having a constant outer diameter in the axial direction; and chamfers 16 having a circular arc-shaped cross section, and connecting together the cylindrical surface 14 and the respective end surfaces 15 of the outer ring 3 on both axial sides thereof. The cylindrical surface 14 is a complete cylindrical surface in that it is free of a recess.

An insulating film 20 that provides electrical insulation between the housing 2 and the outer ring 3 is disposed on the surface of the outer ring 3. The insulating film 20 may be made of a ceramic material. The ceramic material may be, e.g., a metal oxide such as alumina ($Al_2O_3$), titanium oxide ($TiO_2$) or chromium oxide ($Cr_2O_3$). Also, instead of a ceramic material, the insulating film 20 may be made of a resin such as epoxy resin or polyamideimide resin. A resin film of, e.g., epoxy resin or polyamideimide resin can be formed by adding a curing agent to the resin and firing the resin. The thickness of the insulating film 20 can be set within the range of 0.15 mm to 0.45 mm.

The insulating film 20 includes a straight portion 21 extending along the outer periphery of the outer ring 3 and having a constant outer diameter in the axial direction; a pair of end surface portions 22 extending along the respective end surfaces 15 of the outer ring 3 on both axial sides thereof; and a pair of chamfers 23 having a circular arc-shaped cross section and connecting together the straight portion 21 and the respective end surface portions 22. The outer periphery of the straight portion 21 is a complete cylindrical surface in that it is free of a recess.

The housing 2 has an inner peripheral cylindrical surface 24, an axially inner end surface 25, and a non-contact surface 26. The inner peripheral cylindrical surface 24 is a cylindrical inner surface formed on the inner periphery of the housing hole 1 and having a constant inner diameter in the axial direction. The inner peripheral cylindrical surface 24 is formed at a position intersecting with the axial centerlines L of the rolling elements 5. The straight portion 21 of the insulating film 20 is fitted to, and in contact with, the inner peripheral cylindrical surface 24.

One axial end (left end in FIG. 2) of the inner peripheral cylindrical surface 24 is axially displaced from one axial end (left end in FIG. 2) of the straight portion 21 of the insulating film 20, away from the axial centerlines 1i L of the rolling elements 5 (in the leftward direction in FIG. 2). The other axial end (right end in FIG. 2) of the inner peripheral cylindrical surface 24 is axially displaced from the other axial end (right end in FIG. 2) of the straight portion 21 of the insulating film 20 toward the axial centerlines L of the rolling elements 5 (in the leftward direction in FIG. 2).

The axially inner end surface 25 of the housing 2 extends radially inwardly from the one (axial) end (left end in FIG. 2) of the inner peripheral cylindrical surface 24. The axially inner end surface 25 is in contact with one of the end surface portions 22 of the insulating film 20 (left end surface portion 22 in FIG. 2). The non-contact surface 26 of the housing 2 extends radially outwardly from the other (axial) end (right end in FIG. 2) of the inner peripheral cylindrical surface 24.

The contact range (area of contact) A between the inner peripheral cylindrical surface 24 and the straight portion 21 has an axial length shorter than the entire axial length of the straight portion 21. The inner peripheral cylindrical surface 24 is formed such that, within the contact range A are located the major-axis ranges B of contact ellipses defined by the contact between the rolling elements 5 and the outer ring 3. The contact ellipses are elliptical surface contact portions defined by the rolling elements 5 and the outer ring 3 when loads are applied to the rolling elements 5 and the outer ring 3. The sizes of the contact ellipses are determined, by the formula of the Hertz theory, based on the longitudinal elastic modulus and Poisson's ratio of the outer ring 3, the longitudinal elastic modulus and Poisson's ratio of the rolling elements 5, the curvature of the surface of the outer ring raceway groove 12, the curvature of the surfaces of the rolling elements 5, and the magnitude of the loads applied to the rolling elements 5 and the outer ring 3. When determining the sizes of the contact ellipses, the basic static radial load rating can be used as the magnitude of the loads applied to the rolling elements 5 and the outer ring 3.

The outer ring 3, the inner ring 4 and the rolling elements 5 constitute a deep groove ball bearing. This deep groove ball bearing is axially positioned as a whole by positioning, on one axial side, the outer ring 3 with the axial inner end surface 25 of the housing 2, and positioning, on the other axial side, the inner ring 4 with the large-diameter shaft portion 9 of the rotary shaft 7. The end surface portion 22 of the insulating film 20 disposed on, of the end surfaces 15 of the outer ring 3 on both axial sides thereof, the end surface 15 on the other axial side (right side in FIG. 2) is in contact with no member and exposed. Of the end surfaces 17 of the inner ring 4 on both axial sides thereof, the end surface 17 on the one axial side (left side in FIG. 2) is also in contact with no member and exposed.

Even if an insulating film 20 is disposed that provides electrical insulation between the housing 2 and the outer ring 3, when an AC voltage acts between the housing 2 and the outer ring 3, the housing 2 and the outer ring 3, which are separated from each other by the insulating film 20, repeatedly store and discharge electricity as a capacitor, so that an alternating electric current may flow in the rolling bearing. The magnitude of this alternating electric current increases as the impedance between the housing 2 and the outer ring 3 decreases (i.e., as the capacitance between the housing and the outer ring increases). In particular, the magnitude of the alternating electric current increases with an increase in the areas of the portions of the metal surfaces of the housing 2 and the outer ring 3 that are opposed to each other via the insulating film 20, and also increases with a decrease in the distance between the portions of the metal surfaces of the housing 2 and the outer ring 3 that are opposed to each other via the insulating film 20.

Figure 6:
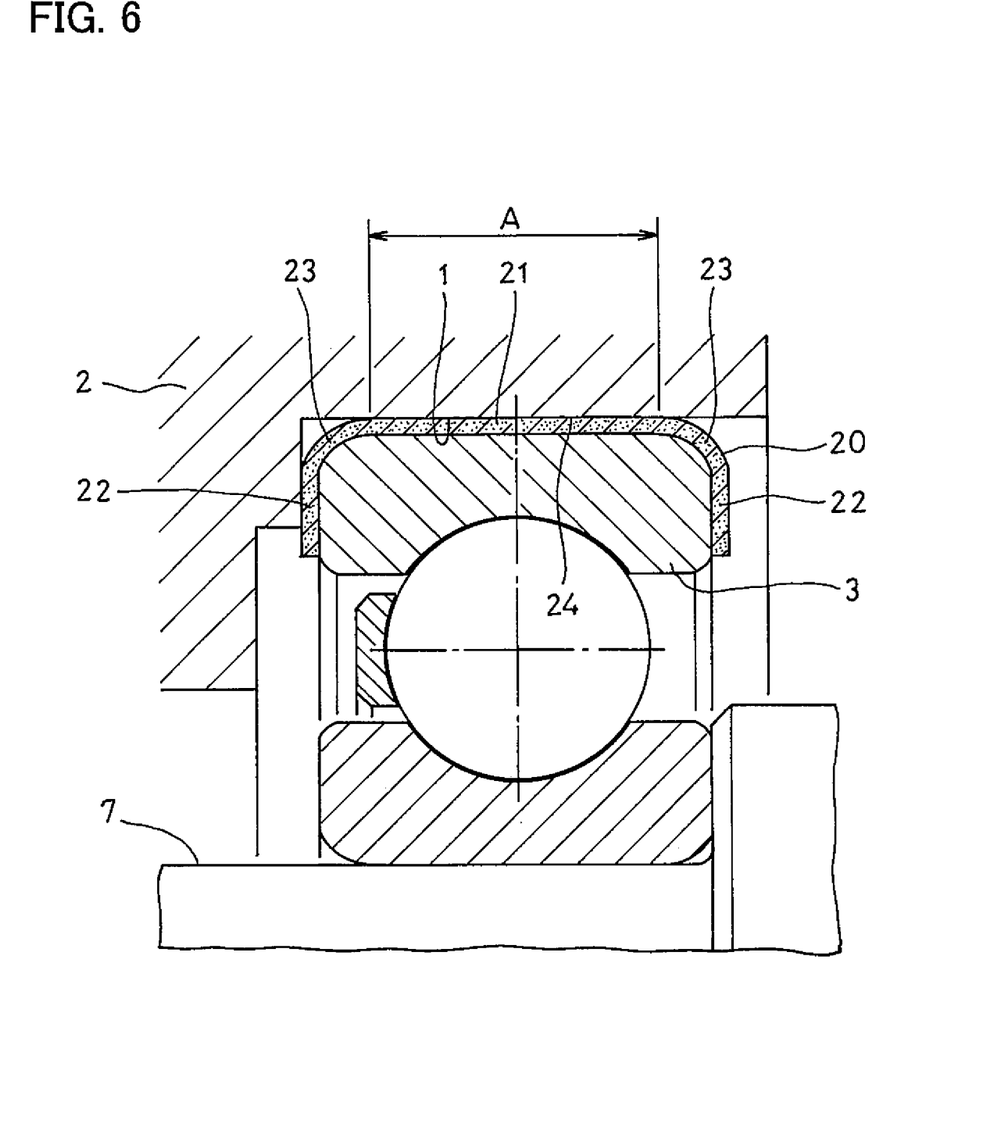
FIG. 6 is a view of an insulated bearing device according to a Comparative Example, the view corresponding to FIG. 2.

Thus, in the insulated bearing device of this embodiment, in order to increase the impedance between the housing 2 and the outer ring 3 (i.e., decrease the capacitance between the housing 2 and the outer ring 3), the axial length of the contact range A between the inner peripheral cylindrical surface 24 and the straight portion 21 is, as illustrated in FIG. 2, made shorter than the entire axial length of the straight portion 21. With this arrangement, the straight portion 21 of the insulating film 20, which extends along the outer periphery of the outer ring 3, is in contact, not along the entire axial length of the straight portion 21, but within a range shorter than the entire axial length of the straight portion 21, with the inner peripheral cylindrical surface 24 of the housing hole 1. Therefore, the contact range A between the inner peripheral cylindrical surface 24 and the straight portion 21 are axially shorter than in the arrangement where, as illustrated in FIG. 6, the straight portion 21 of the insulating film 20 is in contact, along the entire axial length of the straight portion 21, with the inner peripheral cylindrical surface 24 of the housing hole 1, so that the impedance between the housing 2 and the outer ring 3 is higher corresponding to the reduced axial lengths of the contact range A. This effectively reduces the magnitude of the alternating electric current that flows when an AC voltage acts between the housing 2 and the outer ring 3.

Also, for this insulated bearing device, since the portion of the insulating film 20 extending along the outer periphery of the outer ring 3 is a straight portion 21 having a constant outer diameter in the axial direction, and no recess is present in the insulating film 20, formation of the insulating film 20 is easy, and the productivity is excellent. Also, the cost is low.

Also, in this insulated bearing device, it is possible to increase the impedance between the housing 2 and the outer ring 3 while axially positioning the outer ring 3 with the axially inner end surface 25 of the housing 2.

Also, for this insulated bearing device, since, of the insulating film 20 on the outer ring 3, the area of the portion in contact with no member and exposed is wide, the heat dissipation properties are excellent.

Also, in this insulated bearing device, since the major-axis ranges B of contact ellipses defined by the contact between the rolling elements 5 and the outer ring 3 are located within the axial length of the contact range A between the inner peripheral cylindrical surface 24 and the straight portion 21, even when a large load is applied between the rotary shaft 7 and the housing 2, the outer ring 3 is stably supported in the housing hole 1.

Figure 3:
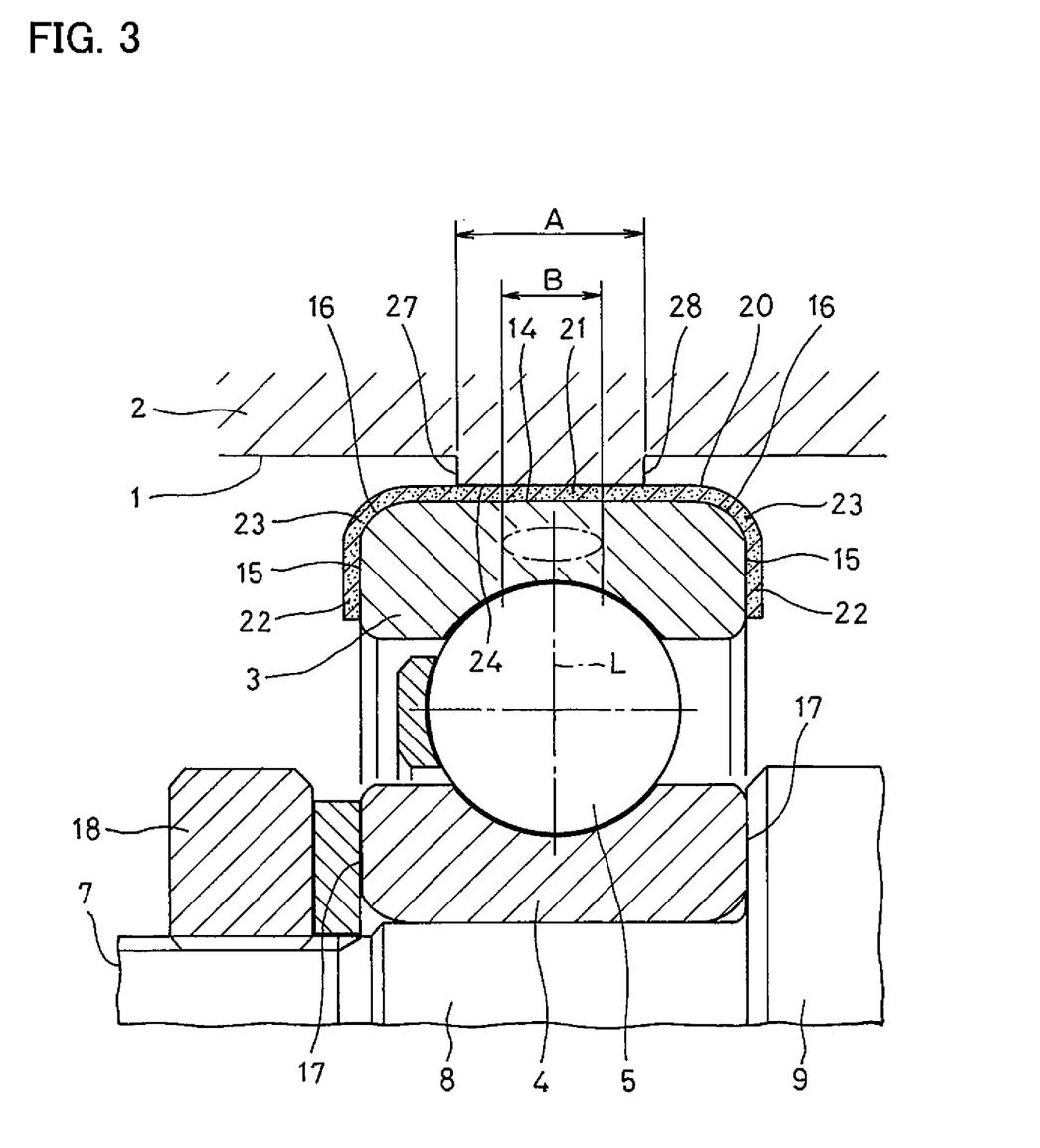
FIG. 3 is a view of an insulated bearing device according to a second embodiment of the present invention, the view corresponding to FIG. 2.

FIG. 3 illustrates an insulated bearing device according to the second embodiment of the present invention. The elements of the second embodiment corresponding to those of the first embodiment are denoted by the same reference numerals, and their description is omitted.

A positioning ring 18 is fixed to the small-diameter shaft portion 8 of the rotary shaft 7, while being in contact with one of the end surfaces 17 of the inner ring 4 on both axial sides thereof, i.e., the end surface 17 (left end surface in FIG. 3) opposite from the end surface 17 kept in contact with the large-diameter shaft portion 9 of the rotary shaft 7.

The housing 2 has an inner peripheral cylindrical surface 24, a first non-contact surface 27 and a second non-contact surface 28. The inner peripheral cylindrical surface 24 is a cylindrical inner surface formed on the inner periphery of the housing hole 1 and having a constant inner diameter in the axial direction. The inner peripheral cylindrical surface 24 is formed at a position intersecting with the axial centerlines L of the rolling elements 5. The straight portion 21 of the insulating film 20 is fitted to, while being in contact with, the inner peripheral cylindrical surface 24.

One axial end (left end in FIG. 3) of the inner peripheral cylindrical surface 24 is axially displaced from one axial end (left end in FIG. 3) of the straight portion 21 of the insulating film 20 toward the axial centerlines L of the rolling elements 5 (in the rightward direction in FIG. 3). The other axial end (right end in FIG. 3) of the inner peripheral cylindrical surface 24 is axially displaced from the other axial end (right end in FIG. 3) of the straight portion 21 of the insulating film 20 toward the axial centerlines L of the rolling elements 5 (in the leftward direction in FIG. 3). The inner peripheral cylindrical surface 24 has an axial length shorter than the axial length of the straight portion 21 of the insulating film 20.

The first non-contact surface 27 of the housing 2 extends radially outwardly from the one (axial) end (left end in FIG. 3) of the inner peripheral cylindrical surface 24. The second non-contact surface 28 of the housing 2 also extends radially outwardly from the other (axial) end (right end in FIG. 3) of the inner peripheral cylindrical surface 24.

The contact range A between the inner peripheral cylindrical surface 24 and the straight portion 21 has an axial length shorter than the entire axial length of the straight portion 21. The inner peripheral cylindrical surface 24 is formed such that the major-axis ranges B of contact ellipses defined by the contact between the rolling elements 5 and the outer ring 3 are located within the axial length of the contact range A.

The outer ring 3, the inner ring 4 and the rolling elements 5 constitute a deep groove ball bearing. This deep groove ball bearing is axially positioned as a whole by positioning the inner ring 4 on one axial side thereof, with the positioning ring 18, which is fixed to the small-diameter shaft portion 8 of the rotary shaft 7, and on the other axial side of the inner ring 4, with the inner ring 4 positioned by the large-diameter shaft portion 9 of the rotary shaft 7. The end surface portions 22 of the insulating film 20 on the end surfaces 15 of the outer ring 3 on both axial sides thereof are both in contact with no members and exposed.

As in the first embodiment, the impedance between the housing 2 and the outer ring 3 is high in this insulated bearing device. Therefore, it is possible to effectively reduce the magnitude of the alternating electric current that flows when an AC voltage acts between the housing 2 and the outer ring 3.

Also, for this insulated bearing device, since the portion of the insulating film 20 extending along the outer periphery of the outer ring 3 is a straight portion 21 having a constant outer diameter in the axial direction, and no recess is present in the insulating film 20, formation of the insulating film 20 is easy, and the productivity is excellent. Also, the cost is low.

Also, in this insulated bearing device, since one axial end and the other axial end of the straight portion 21 of the insulating film 20 are both out of contact with the housing 2, it is possible to particularly effectively decrease the areas of the portions of the housing 2 and the outer ring 3 opposed to each other via the insulating film 20, and to effectively increase the impedance between the housing 2 and the outer ring 3.

Also, for this insulated bearing device, since, of the insulating film 20 on the outer ring 3, the area that is in contact with no member and exposed is wide, the heat dissipation properties are excellent.

Figure 4:
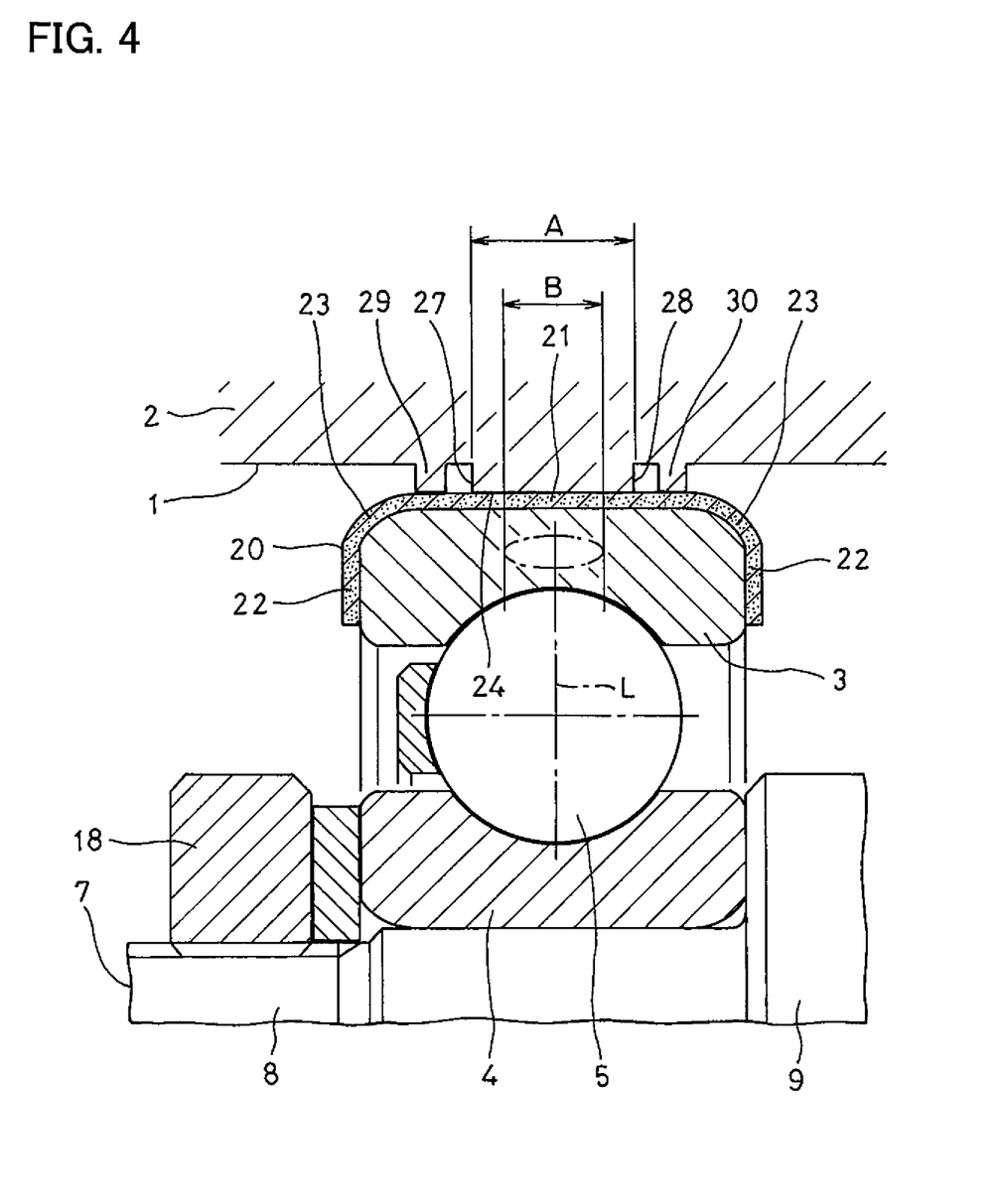
FIG. 4 is a view illustrating a variation of the insulated bearing device of FIG. 3.

FIG. 4 illustrates a variation of the insulated bearing device of the second embodiment. The housing 2 further includes a first auxiliary support portion 29 supporting the outer periphery of the straight portion 21 at a position axially spaced apart from the first non-contact surface 27; and a second auxiliary support portion 30 supporting the outer periphery of the straight portion 21 at a position axially spaced apart from the second non-contact surface 28. With this arrangement, even if a misalignment is present between the center axes of the housing hole 1 and the rotary shaft 7, the outer ring 3 is stably supported. The first and second auxiliary support portions 29 and 30 are protrusions disposed on the inner periphery of the housing hole 1 in the shown example.

Figure 5:
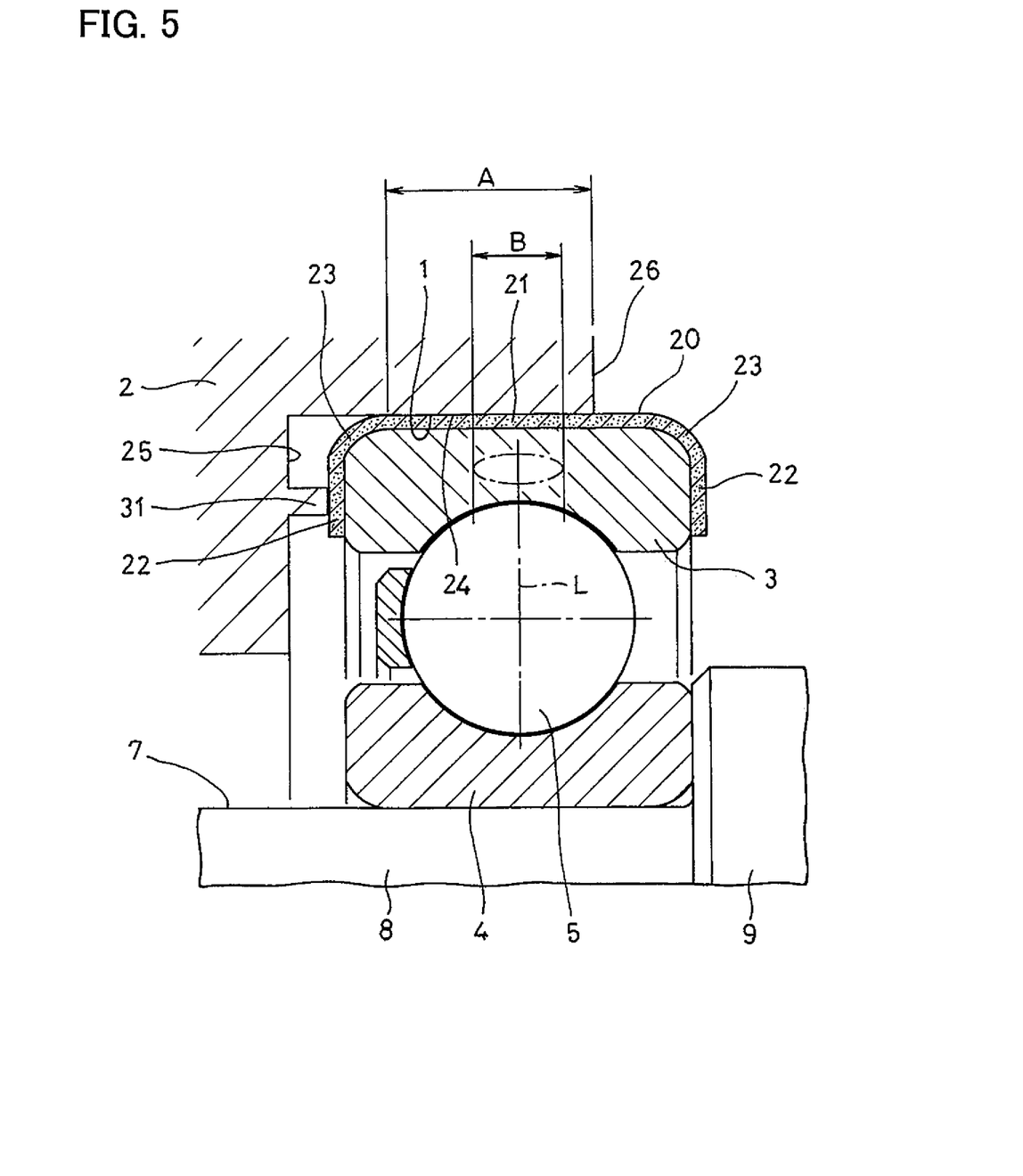
FIG. 5 is a view illustrating a variation of the insulated bearing device of FIG. 2.

FIG. 5 illustrates a variation of the insulated bearing device of the first embodiment. The housing 2 is provided with an axially protruding annular protrusion 31 disposed on the axially inner end surface 25, and having a distal end kept in contact with one of the end surface portions 22 of the insulating film 20 (left end surface portion 22). With this arrangement, it is possible to reduce the areas of the portions of the housing 2 and the outer ring 3 opposed to each other via the one end surface portion 22 of the insulating film 20, and thus to further increase the impedance between the housing 2 and the outer ring 3.

The above-described embodiments are mere examples in every respect, and the present invention is not limited thereto. The scope of the present invention is indicated not by the above description but by the claims, and should be understood to include all modifications within the meaning and scope equivalent to the scope of the claims.

LISTING OF REFERENCE NUMERALS

1: Housing hole
2: Housing
3: Outer ring
4: Inner ring
5: Rolling element
20: Insulating film
21: Straight portion
22: End surface portion
23: Chamfer
24: Inner peripheral cylindrical surface
25: Axially inner end surface
26: Non-contact surface
27: First non-contact surface
28: Second non-contact surface
29: First auxiliary support portion
30: Second auxiliary support portion
A: Contact range (area of contact)
B: Major-axis range B of a contact ellipse
L: Axial centerline

The invention claimed is:

1. An insulated bearing device comprising:
a housing having a housing hole;
an outer ring fitted in the housing hole;
an inner ring arranged radially inwardly of, and coaxially with, the outer ring;
a plurality of rolling elements between the outer ring and the inner ring; and
an insulating film on a surface of the outer ring to provide electrical insulation between the housing and the outer ring,
wherein the insulating film comprises:
a straight portion extending along an outer periphery of the outer ring and having a constant outer diameter in an axial direction;
a pair of end surface portions extending along respective end surfaces of the outer ring on both axial sides of the outer ring; and
a pair of chamfers having a circular arc-shaped cross section, each of the pair of chamfers connecting together the straight portion and a respective one of the end surface portions,
wherein the housing has, on an inner periphery of the housing hole, an inner peripheral cylindrical surface formed at a position intersecting with axial centerlines of the rolling elements, and the straight portion of the insulating film is fitted to, and in contact with, the inner peripheral cylindrical surface, and
wherein an area of contact between the inner peripheral cylindrical surface and the straight portion has an axial length shorter than an entire axial length of the straight portion.

2. The insulated bearing device according to claim 1, wherein the inner peripheral cylindrical surface has first and second axial ends,
wherein the first axial end of the inner peripheral cylindrical surface is axially displaced from a first axial end of the straight portion, away from the axial centerlines of the rolling elements,
wherein the second axial end of the inner peripheral cylindrical surface is axially displaced from a second axial end of the straight portion toward the axial centerlines of the rolling elements, and
wherein the housing has:
an axially inner end surface extending radially inwardly from the first axial end of the inner peripheral cylindrical surface, and kept in contact with one of the end surface portions; and
a non-contact surface extending radially outwardly from the second axial end of the inner peripheral cylindrical surface.

3. The insulated bearing device according to claim 1, wherein the inner peripheral cylindrical surface has first and second axial ends;
wherein the first axial end of the inner peripheral cylindrical surface is axially displaced from a first axial end of the straight portion toward the axial centerlines of the rolling elements, and the second axial end of the inner peripheral cylindrical surface is axially displaced from s second axial end of the straight portion toward the axial centerlines of the rolling elements, and
wherein the housing includes:
a first non-contact surface extending radially outwardly from the first axial end of the inner peripheral cylindrical surface; and
a second non-contact surface extending radially outwardly from the second axial end of the inner peripheral cylindrical surface.

4. The insulated bearing device according to claim 3, wherein the housing further includes:
a first auxiliary support portion supporting an outer periphery of the straight portion at a position axially spaced apart from the first non-contact surface; and
a second auxiliary support portion supporting the outer periphery of the straight portion at a position axially spaced apart from the second non-contact surface.

5. The insulated bearing device according to claim 1, wherein the inner peripheral cylindrical surface is shaped such that major-axis ranges of contact ellipses defined by contact between the rolling elements and the outer ring are located within a range of contact between the inner peripheral cylindrical surface and the straight portion.

6. The insulated bearing device according to claim 2, wherein the inner peripheral cylindrical surface is shaped such that major-axis ranges of contact ellipses defined by contact between the rolling elements and the outer ring are located within a range of contact between the inner peripheral cylindrical surface and the straight portion.

7. The insulated bearing device according to claim 3, wherein the inner peripheral cylindrical surface is shaped such that major-axis ranges of contact ellipses defined by contact between the rolling elements and the outer ring are located within a range of contact between the inner peripheral cylindrical surface and the straight portion.

8. The insulated bearing device according to claim 4, wherein the inner peripheral cylindrical surface is shaped such that major-axis ranges of contact ellipses defined by contact between the rolling elements and the outer ring are located within a range of contact between the inner peripheral cylindrical surface and the straight portion.

* * * * *